United States Patent [19]

Nohmi et al.

[11] Patent Number: 5,191,424
[45] Date of Patent: Mar. 2, 1993

[54] SOLID-STATE CAMERA DEVICE HAVING A FUNCTION FOR ELIMINATING HIGH FREQUENCY SYNCHRONOUS NOISE

[75] Inventors: Nahoko Nohmi; Yukio Endo, both of Kanagawa, Japan

[73] Assignee: Kabushiki Kaisha Toshiba, Kawasaki, Japan

[21] Appl. No.: 538,331

[22] Filed: Jun. 15, 1990

[30] Foreign Application Priority Data

Jun. 16, 1989 [JP] Japan .................................. 1-152109

[51] Int. Cl.⁵ ............................................. H04N 3/335
[52] U.S. Cl. .......................... 358/213.15; 358/213.27; 358/167
[58] Field of Search ...................... 358/213.11, 213.15, 358/213.18, 213.26, 213.27, 213.25, 213.24, 213.16, 213.17, 166, 167, 213.23; 357/24 LR

[56] References Cited

U.S. PATENT DOCUMENTS

| | | | |
|---|---|---|---|
| 4,079,423 | 3/1979 | Diehl | 358/167 |
| 4,175,268 | 11/1979 | Ochi et al. | 357/24 |
| 4,189,751 | 2/1980 | Nagumo | 358/213.25 |
| 4,413,284 | 11/1983 | Izumita et al. | 358/213.15 |
| 4,928,158 | 5/1990 | Kimata | 357/24 LR |
| 4,931,743 | 6/1990 | Fukuda et al. | 358/167 |

OTHER PUBLICATIONS

E. Oda, et al., "A 1920(H)X1035(V) Pixel High-Definition CCD Image Sensor", IEEE Journal of Solid State Circuits, vol. 24, No. 3, Jun. 1989.

National convention Record of the Institute of Television Engineers of Japan, 1989, pp. 31-32.

Primary Examiner—James J. Groody
Assistant Examiner—Glenton B. Burgess
Attorney, Agent, or Firm—Foley & Lardner

[57] ABSTRACT

A solid-state camera device of a horizontal charge-coupled device (HCCD) type includes a large number of CCDs arranged in a matrix to store signal charges, many rows of vertical transfer CCDs for successively reading the signal charge, a dual-line type HCCD for reading the signal charge transferred from the vertical transfer CCDs in synchronism with a horizontal transfer clock signal, an output circuit for outputting a first signal charge as the signal charge for one line transferred from the horizontal transfer CCDs in synchronism with the horizontal transfer clock signal, a band pass filter for selecting a second signal charge including noise having a band of around a frequency of the horizontal transfer clock signal from the first signal charge, a delay memory for delaying the period of the second signal charge for a required period in synchronism with the horizontal transfer clock signal, and a deduction circuit for deducting the second signal charge from the first signal charge provided by the output circuit to obtain an output signal charge not including the second signal charge.

17 Claims, 7 Drawing Sheets

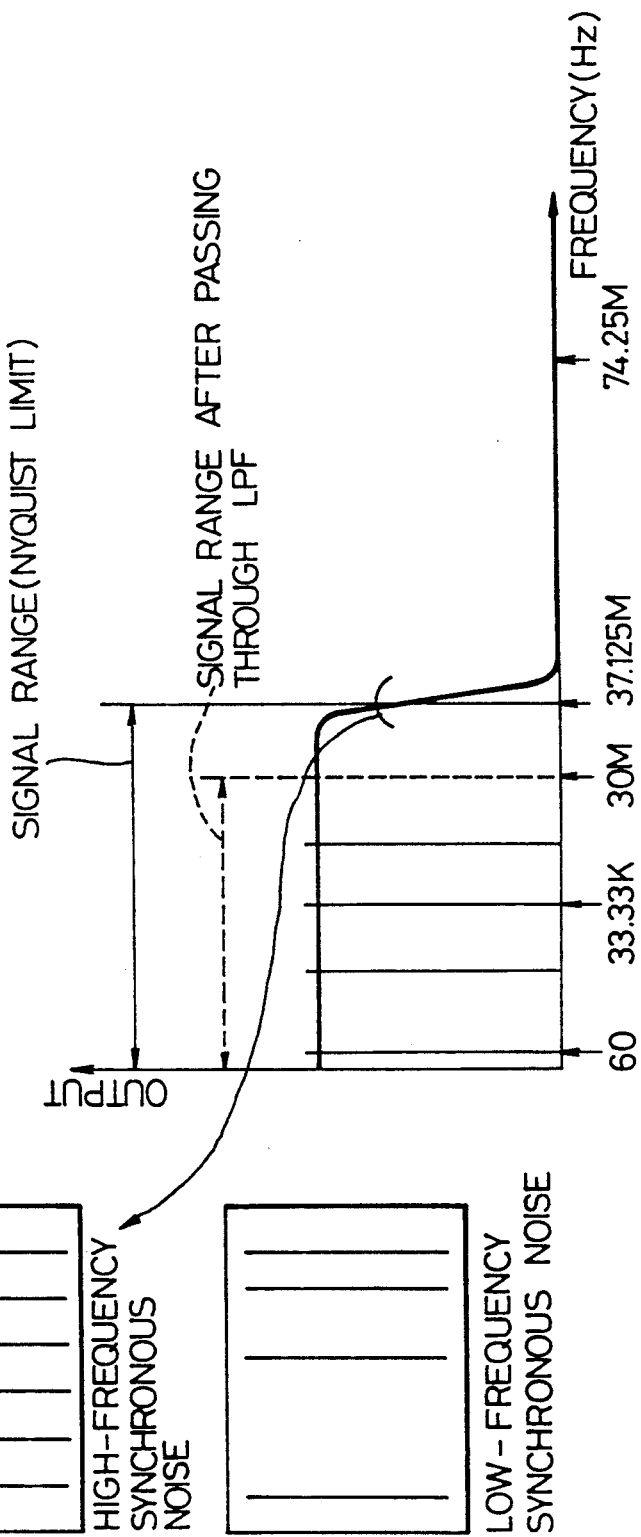

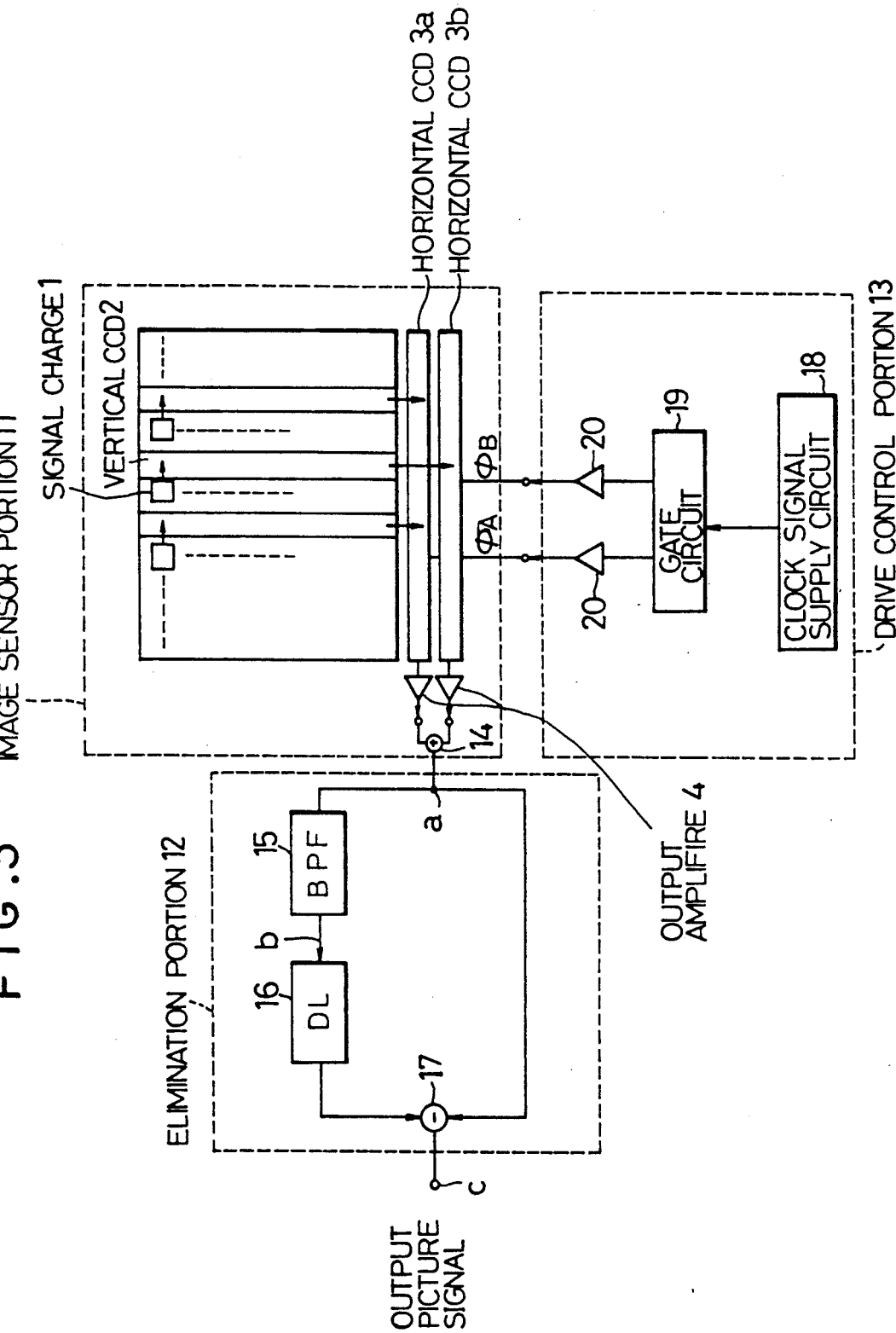

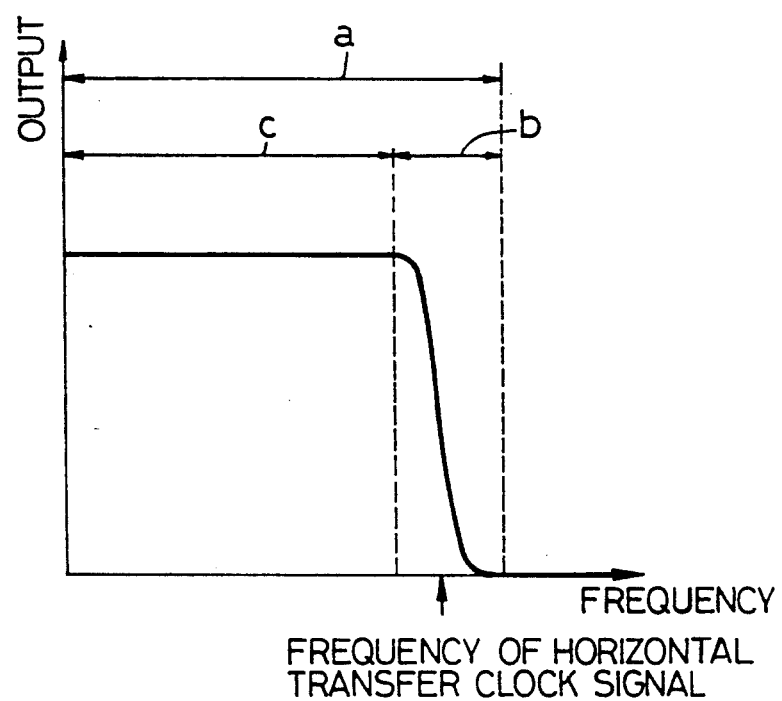

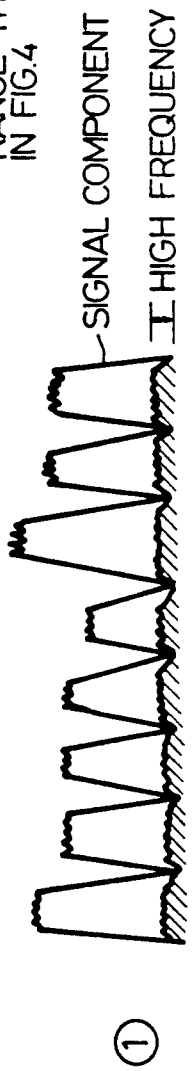
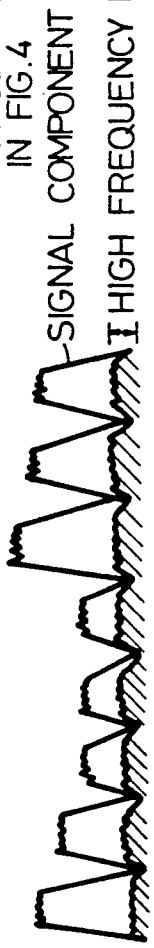
FIG.5A ① PICTURE SIGNAL OF DESIGNATED RANGE THE Nth LINE SHOWN b IN FIG.4 — SIGNAL COMPONENT / HIGH FREQUENCY NOISE
FIG.5B ② PICTURE SIGNAL OF DESIGNATED RANGE THE N+1th LINE SHOWN b IN FIG.4 — SIGNAL COMPONENT / HIGH FREQUENCY NOISE
FIG.5C ③(①-②) SIGNAL COMPONENT / SIGNAL ELIMINATED HIGH FREQUENCY NOISE

SOLID-STATE CAMERA DEVICE HAVING A FUNCTION FOR ELIMINATING HIGH FREQUENCY SYNCHRONOUS NOISE

BACKGROUND OF THE INVENTION

1. Field of the Invention

The present invention relates to a solid-state camera device of an interline type, and particularly to a solid-state camera device which can suppress and reduce a synchronous noise generated on a reproduced image of an object to be picked up.

2. Description of the Prior Art

In CCD (Charge-coupled device) image sensors of the interline type, signal charges corresponding to respective pixels are transferred to a vertical transfer CCD in a vertical blanking period are read by transferring them into each line of horizontal transfer CCD in synchronism with each blanking period of one field period, so as to obtain an image signal.

On reading the signal charges, since each blanking period is set at a predetermined time in advance, when the number of pixels corresponding to the signal charges to be read is increased, the number of the signal charges to be read in a predetermined time is increased. A high speed reading operation, therefore, is required for increasing the number of the pixels, and, particularly, it is necessary to increase the frequency of a horizontal transfer clock signal to be used as a drive signal for transfer drive of the horizontal transfer CCD.

Accordingly, there are CCD image sensors of this type known by adopting a so-called two-line reading method in which the signal charges are read out by using a horizontal transfer clock signal of a frequency half as large as that of each original horizontal transfer clock signal.

As shown in FIG. 1, the two-line reading method comprises arranging two horizontal CCDs 3a, 3b vertically to plural rows vertical CCD 2 for reading signal charges accumulated in signal charge accumulating portions 1 corresponding to respective pixels in the vertical direction. In this construction, signal charges outputted from each vertical CCD 2 are given to the horizontal CCD 3a, 3b alternately, and each the horizontal CCD 3a, 3b is driven by a frequency which is half (e.g., 37.125 MHz) as high as a frequency (e.g., 74.25 MHz) of a horizontal transfer clock signal. Then, image signals having phases shifting 180° to each other are respectively outputted from the horizontal CCD 3a, 3b through output amplifiers 4, then are read into an external circuit (not shown) alternately, so as to obtain an output image signal the same as those obtained by transfer drive of the horizontal CCD by the original frequency (74.25 MHz).

Incidentally, the horizontal transfer clock signal is formed by dividing a signal generated from an original oscillator 5 into 37.125 MHz by a clock setting circuit 6 and a 1/n counter 7, and is provided to each the horizontal CCD 3a, 3b through a gate circuit 8 and amplifiers 9.

In the two-line reading method, when a frequency by which the signal charges are read is, for example, 74.125 MHz, the nyquist limit as the signal range becomes 37.125 MHz as shown in FIG. 2, which is a half of the above frequency (74.25 MHz). This is the same as the above-mentioned frequency (37.125 MHz) of the horizontal transfer clock signal in the two-line method. A high-frequency component of the clock signal therefore is included in the signal range of the output image signal, so as to make a synchronous noise as shown in the same drawing and generate stripes caused by the noise on a monitor image plane at predetermined intervals. (High-frequency synchronous noises shown in FIG. 2)

To suppress the high-frequency synchronous noise, elimination of the high-frequency component has been tried by passing the output image signal through a low-pass filter (LPF) with a cut-off frequency of, for example, 30 MHz.

However, in the method, the high-frequency component of the image signal is also eliminated as well as the clock signal. Thus, the signal range is reduced to about 80% of the original one, and the definition is deteriorated. While, when the cut-off frequency of low-pass filter is set on the high-frequency side in order to suppress the reduction of signal range, it becomes difficult to sufficiently eliminate the high-frequency component of clock signal, thus the stripes of noise appear on the reproduction image plane.

On the other hand, in the solid-state camera device as shown in FIG. 1, as well as the horizontal transfer clock signal, a low-frequency signal such as a transfer clock signal for the vertical CCD 2 and a one-horizontal-period pulse signal included in the signal range of the output image signal is produced by changing the dividing rates of the 1/n counter 7 for the oscillating frequency from the original oscillator 5 under control of the clock setting circuit 6. Therefore another synchronous noise caused by the counter noise is generated in the output image signal, and thereby appears as stripes of noise on the monitor image plant at irregular intervals.(Low-frequency noise in FIG. 2.)

To eliminate the low-frequency synchronous noise, there is a known method that phases of the output image signal are adjusted and read alternately so that the noise components included in the output image signal for the two horizontal CCD 3a, 3b have reverse phases respectively so as to be cancelled to each other.

However, also in the method, since various frequencies of the low-frequency clock signals are included, it is extremely difficult to eliminate the low-frequency synchronous noise completely. Accordingly, stripes as the synchronous noise appear on the monitor image plane at irregular intervals.

As stated above, when it is attempted to completely eliminate the high-frequency noise caused on reading signal charges by the low-pass filter in the conventional two-line type solid-state camera device, the signal range is narrowed and the definition is degraded. Moreover, when it is attempted to suppress the reduction of the signal range by setting the cut-off frequency of the low-pass filter on the high-frequency side, it becomes difficult to sufficiently suppress the synchronous noise, so as to generate stripes as noise on the monitor image plane.

Accordingly, these methods cannot suppress or eliminate the high-frequency synchronous noise without deterioration of the definition.

While, with respect to the low-frequency synchronous noise, it is extremely difficult to eliminate it by the known cancel method, so that stripes as the low-frequency noise are generated on the monitor image plane.

Thus, in the conventional two-line reading method, stripes of noise caused by the high-frequency and low-frequency synchronous noises appear on a reproduced image so as to degrade the reproduced image.

SUMMARY OF THE INVENTION

The present invention is invented in the light of the above problem, and therefore, it is an object to provide a solid-state camera device which can reduce and suppress the synchronous noise and the visual noise without deteriorating the definition so as to provide a fine reproduced image.

To achieve the object, a solid-state camera device as a preferred embodiment of the present invention comprises signal charge accumulating means in a two-dimensional arrangement, plural rows of vertical transfer means for successively reading signal charges accumulated in the signal charge accumulating means, a plurality of horizontal transfer means for reading signal charges read out from the vertical transfer means in synchronism with a horizontal clock signal, output means for obtaining an image signal for one line by combining signal charges read out from the respective horizontal transfer means, selecting means for selecting an image signal obtained by the output means around a frequency area of horizontal transfer clock signal including a frequency of the horizontal transfer clock signal, delaying means for delaying an image signal selected by the selecting means, and deduction means for deducting an image signal selected by the selecting means and delayed by the delaying means in a horizontal scanning period from an image signal obtained by the output means in another horizontal scanning period, so as to obtain an output signal. Thus, a signal around the frequency area including the frequency of the horizontal transfer clock signal of an image signal in a previous line is deducted from the signal area of image signal.

While, a solid-state camera device as another preferred embodiment of the present invention comprises signal charge accumulating means in a two-dimensional arrangement, plural rows of vertical transfer means for successively reading signal charges accumulated in the signal charge accumulating means, a plurality of horizontal transfer means for reading signal charges read out from the vertical transfer means in synchronism with a horizontal clock signal, output means for obtaining image signals for one line by combining signal charges read out from the respective horizontal transfer means, and drive controlling means for controlling transfer by the horizontal transfer means using two horizontal transfer clock signals shifting by ¼ period to each other alternately during every field period or horizontal scanning period. Thus, the drive control of the respective horizontal transfer means are carried out by shifting timings of the horizontal transfer clock signals by ¼ period in every one line or one field.

Moreover, a solid-state camera device formed by combining the functions in the two preferred embodiments comprises signal charge accumulating means in a two-dimensional arrangement, plural rows of vertical transfer means for successively reading signal charges accumulated in the signal charge accumulating means, a plurality of horizontal transfer means for reading signal charges read out from the vertical transfer means in synchronism with a horizontal clock signal, output means for obtaining an image signal for one line by combining signal charges read out from the respective horizontal transfer means, selecting means for selecting an image signal obtained by the output means for selecting an image signal obtained by the output means around a frequency area of horizontal transfer clock signal including a frequency of the horizontal transfer clock signal, delaying means for delaying an image signal selected by the selecting means, deduction means for deducting an image signal selected by the selecting means and delayed by the delaying means in a horizontal scanning period from an image signal obtained by the output means in another horizontal scanning period, so as to obtain output signals, and drive controlling means for controlling transfer by the horizontal transfer means using two horizontal transfer clock signals shifting by ¼ period to each other alternately during every field period of horizontal scanning period. Thus, it becomes possible to reduce and suppress the synchronous noise caused by various clock signals concerned in reading signal charges. As the result, the stripes of noise on the reproducing image plane caused by the high-frequency and low-frequency synchronous noises can be eliminated or visually suppressed, and a fine reproduced image can be obtained.

These and other objects, features and advantages of the present invention will be more apparent from the following description of a preferred embodiment, taken in conjunction with the accompanying drawings.

BRIEF DESCRIPTION OF THE DRAWINGS

FIG. 2 is an explanatory diagram of an operation of the sensor shown in FIG. 1,

FIG. 3 is a constructional view of a solid diagram sensor according to the present invention, FIG. 4 is a diagram showing a relationship between a horizontal transfer clock signal to be used in the solid-state camera device shown in FIG. 3 and the output, FIGS. 5A to 5C are diagrams to respectively show operations of an elimination portion in the solid-state camera device shown in FIG. 3.

DETAILED DESCRIPTION OF THE EMBODIMENT

Hereinafter, embodiments of the present invention will be described with reference to the drawings.

FIG. 3 is a diagram to show construction of a solid-state camera device related to an embodiment of the present invention. In the same drawing, a solid image sensor is the same two-line reading type of the interline transfer CCD image sensor as described in FIG. 1. The solid-state camera device shown in FIG. 3 comprises an image sensor portion 11, an elimination portion 12 for eliminating the high-frequency synchronous noise from an image signal obtained by the image sensor portion 11 and a drive control portion 13 for supplying various clock signals required for the image sensor portion 11. By this construction, respective transfer timings in two horizontal CCD in the image sensor portion 11 are shifted and a signal range including the high-frequency synchronous noise is deducted from the image signal component, so as to suppress or eliminate stripes of synchronous noises on a reproduced image.

Incidentally, in the solid-state camera device of the present invention, either one of the elimination portion 12 and the drive control portion 13 may be removed.

For example, when the drive control portion 13 is removed from the construction system the high-frequency synchronous noise can be eliminated by the function of the elimination portion 12. While, when the elimination portion 12 is removed, stripes of noise appearing on the reproducing image plane (caused by the high-frequency and low-frequency noises) are visually suppressed, so that a line reproduced image can be obtained.

Moreover, when the elimination portion 12 and the drive control portion 13 are used together in the construction, not only the high-frequency synchronous noise can be eliminated, but also the stripes of noise appearing on the reproducing image plane can be visually suppressed, thus a fine reproduced image can be obtained.

Hereinafter, construction of the elimination portion 12 and the drive control portion 13 will be explained.

Figure 1:
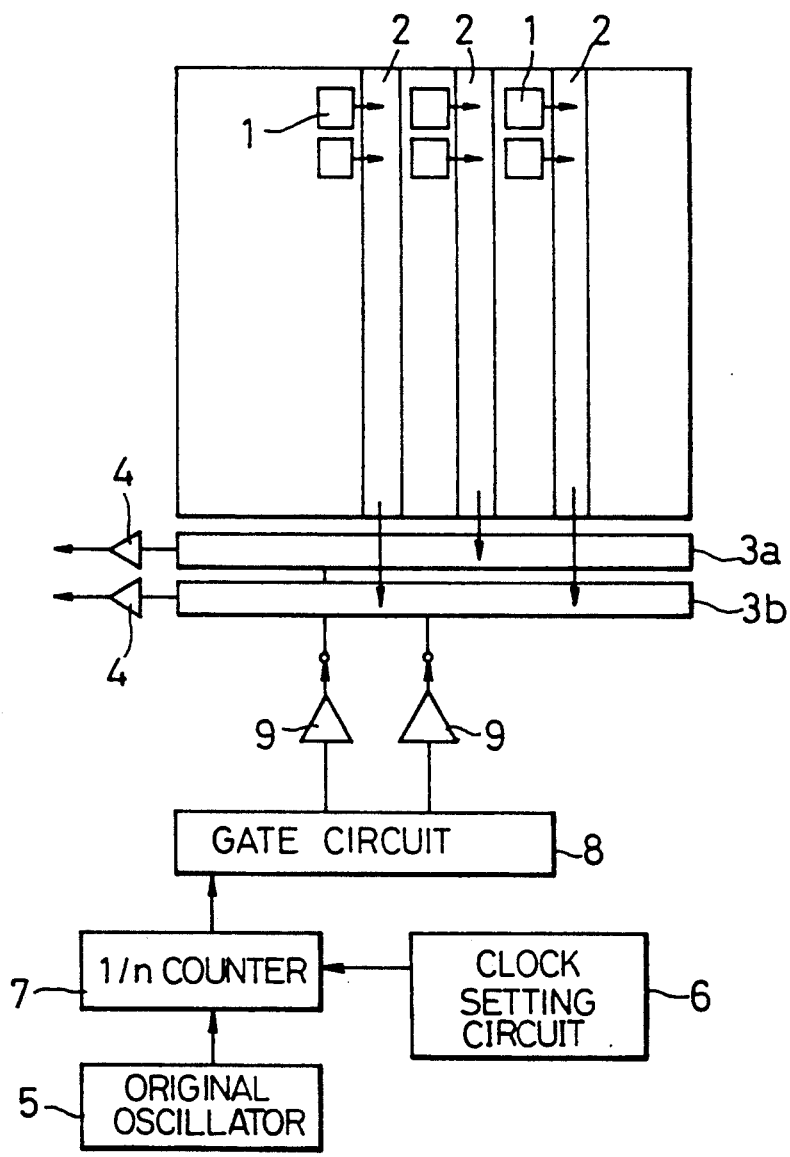
FIG. 1 is a constructional diagram of a conventional solid-state camera device.

In FIG. 3, the image sensor portion 11 comprises, is the same as the solid-state camera device shown in FIG. 1, a signal charge accumulating portion 1, vertical CCD 2, two horizontal CCD 3a, 3b and a synthesizing circuit 14 for reproducing an image signal for one line using respective image signals generated from the horizontal CCD 3a, 3b through an output amplifier 4 and having a phase difference of 180° to each other. The synthesizing circuit 14 is provided on an on-chip or an external circuit. Moreover, the image signal for one line produced by the synthesizing circuit 14 are given to the elimination portion 12.

The elimination portion 12 is composed of a band-pass filter (BPF) 15, a delay memory (DL) 16 and a deduction circuit 17.

The band-pass filter 15 is a filter for passing an image signal in a signal range of several MHz including a frequency of the horizontal transfer clock signal for driving transfer of the horizontal CCD 3a, 3b, the signal range being included in a signal range of the image signal outputted from the synthesizing portion 14. For example, when the reading frequency is 74.25 MHz, the band-pass filter 15 passes only image signals in a signal range of several MHz including a frequency of 37.125 MHz as a frequency of the horizontal transfer clock signal, e.g., a range of ±5 MHz around 37.125 MHz. Accordingly, when the frequency characteristics of the image signal as output (at a point a in FIG. 3) of the synthesizing circuit 14 show range characteristics as shown by a in FIG. 4, an output range (at a point b in FIG. 3) of the band-pass filter 15 becomes as shown by b in FIG. 4. Then, each the image signal passed through the band-pass filter 15 in the range is given to the delay memory 16.

The delay memory (DL) 16 is a memory for holding an image signal for one line given from the band-pass filter 15 for one horizontal scanning period and then outputting it. Namely, the delay memory 16 holds an image signal comprising signal charges accumulated in the signal charge accumulating portion 1 for one line which passed through the band-pass filter 15 until a next image signal for one line is given from the synthesizing circuit 14 to the elimination portion 12, so as to delay the image signal for one horizontal scanning period. Then, the image signal delayed by the delay memory 16 is given to the deduction circuit 17.

The deduction circuit 17 receives the image signals in the signal range for one line outputted from the synthesizing circuit 14 and an image signal for one line around the upper limit of the signal range delayed for one horizontal scanning period and outputted by the delay memory 16, and deducts the image signal around the upper limit of the signal range from the image signal in the signal range.

In the above mentioned construction, when an image signal passed through the band-pass filter 15 of image signals of the n-th line picked up by the image sensor portion 11 and outputted from the synthesizing circuit 14 includes a high-frequency noise portion of the horizontal transfer clock signal as shown in FIG. 5A, the image signal is given to the delay memory 16 and held for one horizontal scanning period.

Thereafter, image signals of the (n+1)th line are given from the synthesizing circuit 14 to the elimination portion 12 in the next one-horizontal scanning period. At the time, the image signals of the (n+1)th line are given to the band-pass filter 15 as well as the deduction circuit 17. Of the image signals of the (n+1)th line given to the band-pass filter 15, only image signals on the high-frequency side as shown in FIG. 5B pass through the filter 15. Namely, each the image signal of the (n+1)th line passed through the band-pass filter 15 and having a wave form as shown in FIG. 5B is a signal component (shown by b in FIG. 4) on the high-frequency side of the signal range (shown by a in FIG. 4) of the image signals in the (n+1)th line given from the synthesizing circuit 14 to the deduction circuit 17.

Then, from the image signal in the (n+1)th line given from the synthesizing circuit 14 to the deduction circuit 17, the image signal in the n-th line delayed by the delay memory 16 for one horizontal scanning period and passed through the band-pass filter 15 is deducted by the deduction circuit 17. Namely, the image signal having a wave form as shown in FIG. 5B is deducted from the image signal having a wave form as shown in FIG. 5A. In this case, the high-frequency noise is similar in both the image signals of the n-th line and the (n+1)th line.

Accordingly, the high-frequency noise of the image signal in the (n+1)th line is cancelled to the high-frequency noise of the image signal in the n-th line, so that an image signal in a range as shown by b in FIG. 4 having a wave form as shown in FIG. 5C can be obtained.

Therefore, the output image signal in the (n+1)th line outputted from the deduction circuit 17 is obtained as an image signal in a range where the frequency component of the horizontal clock signal is not included.

By the operation for cancelling the high-frequency noise of the output image signal for one line by the high-frequency noise of the output image signal in the previous line over all the lines in the image sensor 11, the high-frequency synchronous noise caused by the horizontal clock signal and appearing in the stripe state on the reproduction image plane can be suppressed and eliminated.

Next, construction and operation of the drive control portion 13 is described.

The drive control portion 13 is composed of a clock signal supply circuit 18, a gate circuit 19 and an output amplifier 20.

Figure 6:
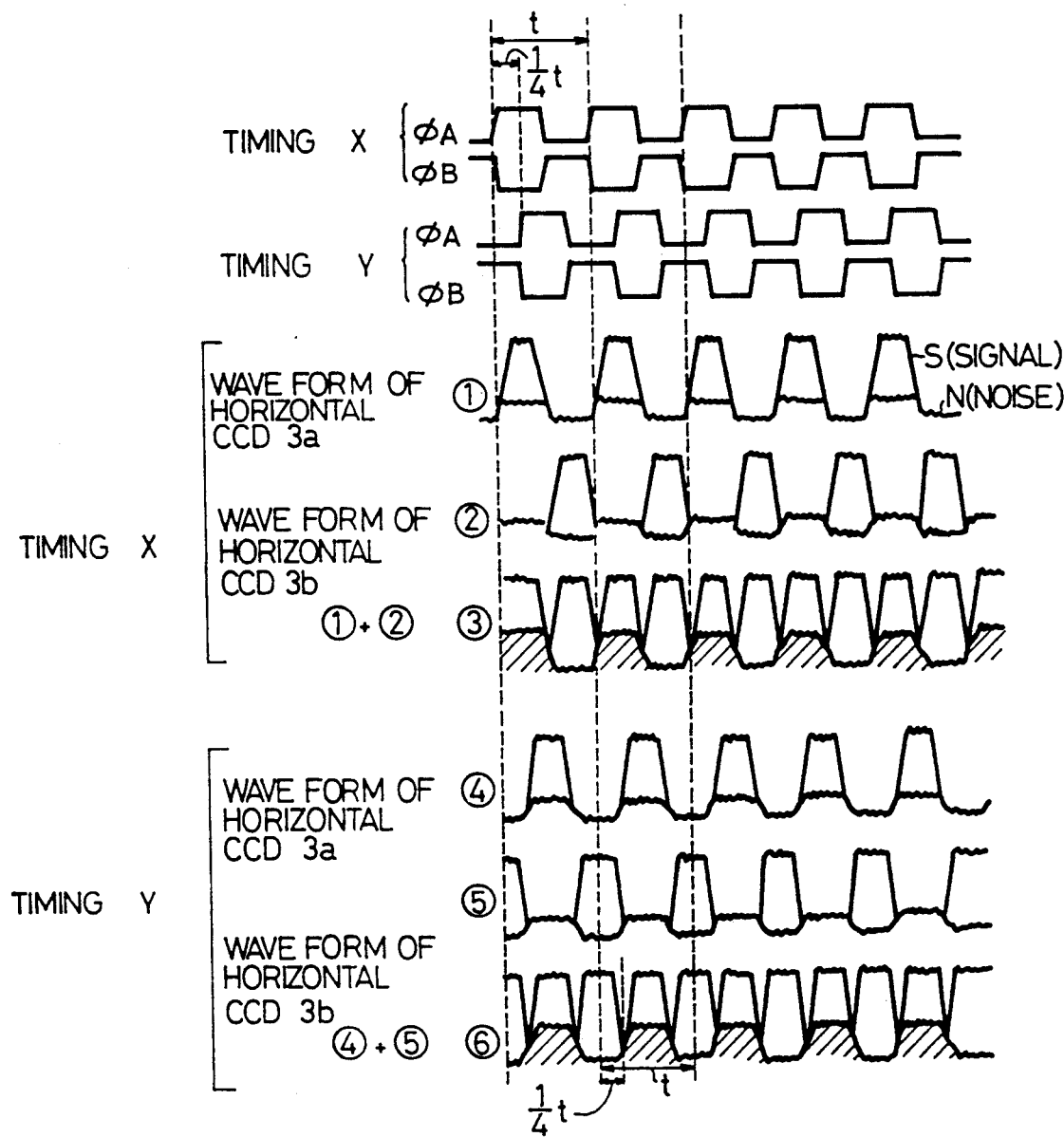
FIG. 6 is a diagram to show an operation of a drive control portion in the solid-state camera device shown in FIG. 3, and FIGS. 7A and 7B are diagrams of examples of images to be obtained by the operation of the drive control portion of the solid-state camera device shown in FIG. 3.

The clock signal supply circuit 18 produces horizontal transfer clock signals $\phi A$, $\phi B$ for driving transfer of the horizontal CCD 3a, 3b respectively so that a relation between phases of these signals $\phi A$, $\phi B$ becomes as shown in FIG. 6. Namely, in FIG. 6, the phases of these horizontal transfer clock signals $\phi A$, $\phi B$ are in the reverse relationship to each other. Thereby, the respective horizontal CCD 3a, 3b transfer signal charges given from the vertical CCD alternately.

Moreover, these horizontal transfer clock signals φA, φB are produced at two timings of X and Y, as shown in FIG. 6.

As clearly seen from FIG. 6, the horizontal transfer clock signals φA, φB at the timing of Y respectively shift by ¼ periods to the horizontal transfer clock signals φA, φB at the timing of X. These horizontal transfer clock signals φA, φB are given to the gate circuit 19. Then, the horizontal transfer clock signals φA is given to the horizontal CCD 3a, and φB is given to the horizontal CCD 3b. Moreover, on scanning, for instance, in an A field in the CCD1 of the image sensor 11, the transfer by horizontal CCD 3a, 3b is driven over all the lines at the timing of X, while on scanning in a B field in the CCD1, the transfer by horizontal CCD 3a, 3b is driven over all the lines at the timing of Y.

When the transfer by the horizontal CCD 3a, 3b is carried out by the horizontal transfer clock signals φA, φB at the timing of X shown in FIG. 6, an output wave form of an image signal outputted from the horizontal CCD 3a becomes as shown by reference character ① in FIG. 6, and the signal component (S) and the noise component (N) thereof are in the same phase relation. While, an output wave form of an image signal outputted from the horizontal CCD 3b becomes as shown by reference character ② in FIG. 6, and the signal component and the noise component are in the reverse phase relation. Accordingly, when the outputs from the horizontal CCD 3a and horizontal CCD 3b are read alternately by the synthesizing circuit 14, the output wave form becomes as shown by reference character ③ in FIG. 6. As the result, the noise component shown by oblique lines and included in the signal component in the resultant wave form is recognized more clearly in every other pixel.

While, when the transfer by the horizontal CCD 3a, 3b is carried out by the horizontal transfer clock signals φA, φB at the timing of Y shown in FIG. 6, an output wave form of an image signal outputted from the horizontal CCD 3a becomes as shown by reference character ④ in FIG. 8. The wave form delays to that shown by ① in FIG. 6 by ¼ period, and the signal component and the noise component thereof are in the same phase relation. While, an output wave form of an image signal outputted from the horizontal CCD 3b becomes as shown by reference character ⑤ in FIG. 6. The wave form delays to that shown by ② in FIG. 6 by ¼ period, and the signal component and the noise component thereof are in the reverse phase relation. Accordingly, when the outputs from the horizontal CCD 3a, 3b are read in the synthesizing circuit 14 alternately, the resultant output wave form becomes as shown by reference character ⑥ in FIG. 6. As the result, the noise component shown by oblique lines and included in the signal component in the resultant wave form is recognized more clearly in every other pixel.

Thus, the phases of the image signal obtained by the transfer by the horizontal CCD 3a, 3b by the horizontal clock signals at the timing of X and the image signal obtained by the transfer by the horizontal CCD 3a, 3b by the horizontal clock signals at the timing of Y shift by ¼ period as shown by waveforms ③ and ⑥ in FIG. 6.

Moreover, applying the phase shift in the resultant image signals to a TV system of 2:1 interlace type in which one frame is composed of two fields, the transfer by the horizontal CCD 3a, 3b at the timing of X is carried out over all the lines on scanning in the A field, while the transfer by the horizontal CCD 3a, 3b at the timing of Y is carried out over all the lines on scanning in the B field.

Figure 7A:
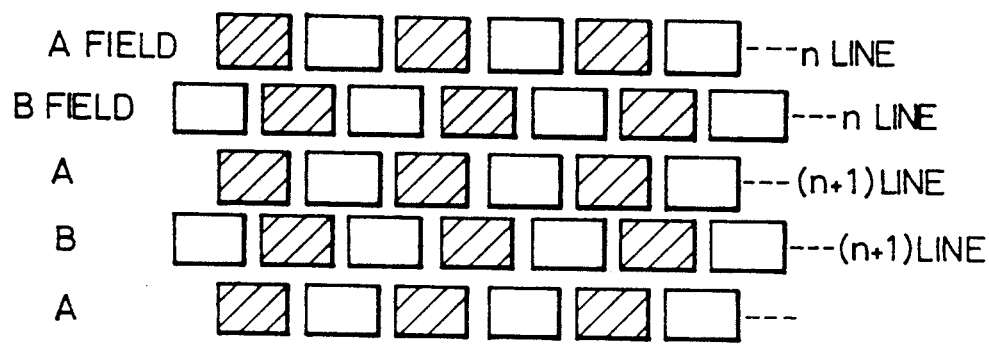

By the transfer operation, on a reproduction image plane comprising an image signal for one frame outputted from the synthesizing circuit 14, an image in which each adjacent pair of lines shifts by ½ pixel as shown by oblique lines in FIG. 7A is obtained. Accordingly, on such an image plane, each portion of image signal in each adjacent pair of lines, in which is included the low-frequency or high-frequency noise, shifts by ½ pixel as shown in FIG. 6.

As the result, though the synchronous noise appears in the stripe state on the reproduction image plane in the vertical direction thereof because each the image signal includes the synchronous noise at the same phase over all the lines in each field in the prior art, in the embodiment, each the synchronous noise in each the adjacent pair of lines shifts by ½ pixel as shown in FIG. 7A. Accordingly, the stripes on the image plane caused by the synchronous noise can be avoided so that the noise becomes visually unrecognized.

Figure 7B:
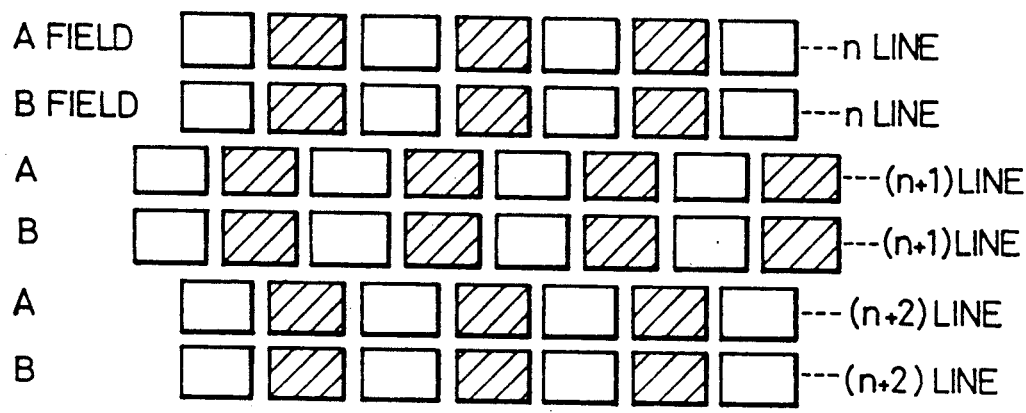

Incidentally, in this embodiment, it is possible to carry out the transfer by the horizontal CCD 3a, 3b by alternately changing the timings of X and Y for each pair of lines in the fields of A and B. In this case, the resultant reproduction image plane becomes as shown in FIG. 7B, and each pair of noise portions shown by oblique lines in each pair of lines in the field of A and B shift by ½ pixel. Accordingly, a similar effect to that shown in FIG. 7A can be obtained.

As stated above, it is possible to compose the solid-state camera device of the present invention with either of the elimination portion 12 and the drive control portion 13.

While, according to a solid-state camera device including the elimination portion 12 and the drive control portion 13 together, the high-frequency synchronous noise can be further eliminated from a reproduced image (as shown in FIGS. 7A and 7B) obtained by the solid-state camera device including only the drive control portion 13. Accordingly, it is possible to obtain a reproduced image in which the low-frequency and the high frequency noise are suppressed and eliminated without deteriorating the definition.

Moreover, the band-pass filter 15 passes an image signal in the range of at most 37.125±5 MHz, it is possible to select the most suitable value corresponding to the construction of the solid-state camera device as far as it satisfies the range.

Various modification will become possible for those skilled in the art after receiving the teachings of the present disclosure without departing from the scope thereof.

What is claimed is:

1. A solid-state camera device of the horizontal charge-coupled device type, comprising:
   signal charge accumulating means forming plural lines in a two-dimensional arrangement to store a signal charge;
   a plurality of rows of vertical transfer means for successively reading the signal charges accumulated in the signal charge accumulating means;
   horizontal transfer means for reading the signal charges transferred from the vertical transfer means in synchronism with a horizontal transfer clock signal;

output means for outputting a first signal charge as the signal charge for one line transferred from the horizontal transfer means in synchronism with the horizontal transfer clock signal;

selecting means for selecting a second signal charge including noise in a width from about the frequency of the horizontal transfer clock signal to the frequency of the first signal charge;

delaying means for delaying the second signal charge for a required period in synchronism with the horizontal transfer clock signal; and deduction means for deducting the second signal charge from the first signal charge provided by the output means, to obtain an output signal charge which excludes the second signal charge.

2. The solid-state camera device according to claim 1, wherein the delaying means includes a delay memory.

3. A solid-state camera device according to claim 1, wherein each horizontal transfer means is driven by the horizontal transfer clock signal having the timings to transfer the signal charges per one horizontal scanning period to the output means under the control of the drive control means.

4. A solid-state camera device according to claim 1, wherein each horizontal transfer means is driven by the horizontal transfer clock signal having the timings X and Y to transfer the signal charges per one field period to the output means under the control of the drive control means.

5. A solid-state camera device of a horizontal charge-coupled device type, comprising:

signal charge accumulating means forming plural lines in a two-dimensional arrangement to store a signal charge;

a plurality of rows of vertical transfer means for successively reading the signal charge accumulated in the signal charge accumulating means;

horizontal transfer means for reading a first signal charge as the signal charge transferred from the vertical transfer means in synchronism with a horizontal transfer clock signal;

drive control means for controlling transfer of the first signal charges in the horizontal transfer means by the horizontal transfer clock signals controlled by at least two different timings, output means for outputting the first signal charge in synchronism with the horizontal transfer clock signal for one line;

selecting means for selecting a second signal charge including noise having a band of around a frequency of the horizontal transfer clock signal from the first signal charge transferred from the output means;

delaying means for delaying the period of the second signal charge for a required period in synchronism with the horizontal transfer clock signal; and deduction means for deducting the following signal charge provided by the output means to obtain an output signal charge not including the second signal charge.

6. A solid-state camera device according to claim 5, wherein the number of horizontal transfer means is two, the frequency of the horizontal transfer clock signal of the horizontal transfer means is a maximum of 37.125±5 MHz, and the delaying means delays the second signal charge for one period of the horizontal transfer clock signal.

7. The solid-state camera device according to claim 5, wherein the signal charge accumulating means is a charge-coupled device.

8. The solid-state camera device according to claim 5, wherein the selecting means includes a band-pass filter.

9. The solid-state camera device according to claim 5, wherein the delaying means includes a delay memory.

10. The solid-state camera device according to claim 5, wherein the deduction means outputs the output signal charge by deducting the second signal charge of a $(n-1)$-th line provided by the delaying means from the first signal charge of a n-th line provided by the output means.

11. A solid-state camera device according to claim 5, wherein the plural lines in the signal charge accumulating means are divided into two fields A and B, the number of the horizontal transfer means being two, to transfer the signal charges of the fields A and B, and the horizontal transfer clock signal is controlled by using two different timings X and Y with each timing being different by ¼ period of a phase.

12. A solid-state camera device according to claim 5, wherein each horizontal transfer means is driven by the horizontal transfer clock signal having the timings X and Y, to transfer the signal charges per one horizontal scanning period to the output means under control of the drive control means.

13. A solid-state camera device according to claim 5, wherein each horizontal transfer means is driven by the horizontal transfer clock signal having the timings X and Y, to transfer the signal charges per one field period to the output means under the control of the drive control means.

14. A solid-state camera device of the horizontal charged-coupled device type, comprising:

signal charge accumulating means forming plural lines in a two-dimensional arrangement, to store signal charges;

a plurality of rows of vertical transfer means for successively reading the signal charges accumulated in the signal charge accumulating means;

horizontal transfer means for reading the signal charges transferred from the vertical transfer means in synchronism with a horizontal transfer clock signal;

output means for outputting a first signal charge as the signal charge for one line transferred from the horizontal transfer means in synchronism with the horizontal transfer clock signal;

selecting means for selecting a second signal charge, including noise in a width from about the frequency of the horizontal transfer clock signal to the frequency of the first signal charge;

delaying means for delaying the second signal charge for a required period in synchronism with the horizontal transfer clock signal; and deduction means for deducting the second signal charge from the first signal charge provided by the output means to obtain signal charge which excludes the second signal charge, wherein the number of the horizontal transfer means is two, the frequency of the horizontal transfer clock signal of the horizontal transfer means is a maximum of 37.125±5 MHz, and the delaying means delays the second signal charge for one period of the horizontal transfer clock signal.

15. A solid-state camera device of the horizontal charge-coupled device type. comprising:
- signal charge accumulating means forming plural lines in a two-dimensional arrangement, to store a signal charge;
- a plurality of rows of vertical transfer means for successively reading the signal charges accumulated in the signal charge accumulating means;
- horizontal transfer means for reading the signal charges transferred from the vertical transfer means in synchronism with a horizontal transfer clock signal;
- output means for outputting a first signal charge as the signal charge for one line transferred from the horizontal transfer means in synchronism with the horizontal transfer clock signal;
- selecting means for selecting a second signal charge, including noise in a width from about the frequency of the horizontal transfer clock signal to that of the first signal charge;
- delaying means for delaying the second signal charge for a required period in synchronism with the horizontal transfer clock signal; and
- deduction means for deducting the second signal charge from the first signal charge provided by the output means to obtain an output signal charge which excludes the second signal charge,
- wherein the deduction means outputs the output signal charge by deducting the second signal charge of a n-th line provided by the delaying means from the first signal charge of a (n+1)-th line provided by the output means.

16. A solid-state camera device of the horizontal charge-coupled device type, comprising:
- signal charge accumulating means forming plural lines in a two-dimensional arrangement to store a signal charge;
- a plurality of rows of vertical transfer means for successively reading the signal charges accumulated in the signal charge accumulating means;
- horizontal transfer means for reading the signal charges transferred from the vertical transfer means in synchronism with a horizontal transfer clock signal;
- output means for outputting a first signal charge as the signal charge for one line transferred from the horizontal transfer means in synchronism with the horizontal transfer clock signal;
- selecting means for selecting a second signal charge including noise in a band from about the frequency of the horizontal transfer clock signal to the frequency of the first signal charge;
- delaying means for delaying the second signal charge for a required period in synchronism with the horizontal transfer clock signal; and
- deduction means for deducting the second signal charge from the first signal charge provided by the output means to obtain an output signal charge which excludes the second signal charge,
- wherein the selecting means is composed of a bandpass filter, the number of the horizontal transfer means is two, the frequency of the horizontal transfer clock signal of the horizontal transfer means has a maximum frequency of $37.125 \pm 5$ MHz, and the delaying means delays the second signal charge for one period of the horizontal transfer clock signal.

17. A solid-state camera device of the horizontal charge-coupled device type, comprising:
- signal charge accumulating means forming plural lines in a two-dimensional arrangement, to store a signal charge;
- a plurality of rows of vertical transfer means for successively reading the signal charges accumulated in the signal charge accumulating means;
- horizontal transfer means for reading the signal charges transferred from the vertical transfer means in synchronism with a horizontal transfer clock signal;
- output means for outputting a first signal charge as the signal charge for one line transferred from the horizontal transfer means in synchronism with the horizontal transfer clock signal;
- selecting means for selecting a second signal charge including noise in a band from about the frequency of the horizontal transfer clock signal to the frequency of the first signal charge;
- delaying means for delaying the second signal charge for a required period in synchronism with the horizontal transfer clock signal; and
- deduction means for deducting the second signal charge from the first signal charge provided by the output means to obtain an output signal charge which excludes the second signal charge;
- wherein the selecting means is composed of a bandpass filter, and the deduction means outputs the output signal charge by deducting the second signal charge of an n-th line provided by the delaying means from the first signal charge of a (n+1)-th line provided by the output means.

* * * * *